United States Patent
Artigue et al.

(10) Patent No.: US 8,930,810 B2
(45) Date of Patent: Jan. 6, 2015

(54) USER INTERFACE (UI) COLOR SCHEME GENERATION AND MANAGEMENT ACCORDING TO VISUAL CONSISTENCY OF VISUAL ATTRIBUTES IN THE COLOR SCHEME

(75) Inventors: Olivier Artigue, Bures sur Yvette (FR); Thomas Baudel, Paris (FR)

(73) Assignee: International Business Machines Corporation, Armonk, NY (US)

( * ) Notice: Subject to any disclaimer, the term of this patent is extended or adjusted under 35 U.S.C. 154(b) by 503 days.

(21) Appl. No.: 13/372,394

(22) Filed: Feb. 13, 2012

(65) Prior Publication Data

US 2013/0207988 A1     Aug. 15, 2013

(51) Int. Cl.
*G06F 17/21*    (2006.01)

(52) U.S. Cl.
USPC ........................................................... 715/243

(58) Field of Classification Search
CPC ...................................... G06F 17/218
USPC ...................................... 715/243
See application file for complete search history.

(56) References Cited

U.S. PATENT DOCUMENTS

| | | | |
|---|---|---|---|
| 7,328,409 B2 | 2/2008 | Awada et al. | |
| 7,639,394 B2 | 12/2009 | Forbush et al. | |
| 7,908,221 B2 | 3/2011 | Bodmer et al. | |
| 2002/0152244 A1* | 10/2002 | Dean et al. | 707/530 |
| 2003/0172193 A1* | 9/2003 | Olsen | 709/315 |
| 2005/0278622 A1* | 12/2005 | Betts et al. | 715/515 |
| 2006/0059430 A1 | 3/2006 | Bells et al. | |
| 2007/0061744 A1* | 3/2007 | Smith et al. | 715/763 |
| 2007/0209011 A1* | 9/2007 | Padmanabhuni et al. | 715/762 |
| 2007/0220035 A1* | 9/2007 | Misovski | 707/102 |
| 2009/0265368 A1* | 10/2009 | Crider et al. | 707/102 |
| 2011/0041074 A1 | 2/2011 | Bells et al. | |

OTHER PUBLICATIONS

Memon, Atif, Ishan Banerjee, and Adithya Nagarajan. "GUI Ripping: Reverse Engineering of Graphical User Interfaces for Testing." In Proceedings of the 10th Working Conference on Reverse Engineering, p. 260. IEEE Computer Society, 2003.*

Rinzel, et al., User interface customization techniques in blackboard learntm, release 9. Aug. 6, 2011.

* cited by examiner

*Primary Examiner* — Frank D Mills
(74) *Attorney, Agent, or Firm* — Steven M. Greenberg, Esq.; CRGO Law

(57) ABSTRACT

Embodiments of the invention provide a method of generating a UI visual presentation attribute scheme while preserving visual consistency of selected visual presentation attributes in the color scheme is provided. The method includes establishing a hierarchy of UI elements in a directed acyclic graph of nodes. The method yet further includes computing a visual presentation attribute for each child node of the hierarchy descending from a selected parent node according to an established transformation rule. Finally, the method includes exporting the hierarchy into a visual presentation attribute scheme. To the extent the visual presentation attribute is a color, the visual presentation attribute scheme can be a color scheme applicable to an application to define the color scheme of the application.

20 Claims, 2 Drawing Sheets

USER INTERFACE (UI) COLOR SCHEME GENERATION AND MANAGEMENT ACCORDING TO VISUAL CONSISTENCY OF VISUAL ATTRIBUTES IN THE COLOR SCHEME

BACKGROUND OF THE INVENTION

1. Field of the Invention

The present invention relates to UI color scheme management.

2. Description of the Related Art

The graphical UI forms the basis of the visual computing environment. While underlying program logic can perform tasks on input provided by an end user in order to generate output, it is the UI that permits a visual interface through which the end user can provide the requisite programmatic input and present the generated output for cognition by the end user. Integral to a functional UI is a selection of UI controls or widgets, such as buttons, text fields, sliders, image displays and the like. Additionally, the coloring of each of the widgets—namely the color scheme—can be of equal importance as some colors coordinate well with one another, while others clash or otherwise render the visual understanding of a UI difficult.

While some end users accept the default color scheme proposed by the operating system or application, other end users prefer to choose personalized color schemes based upon constraints such as visual impairments, environmental conditions such as a darkly or brightly illuminated work environment, or other personal preferences. Yet, the modern display adapter permits an enormous color palette, in many cases over sixteen million possible colors. Providing the end user with a tool to edit the color scheme by changing only a few colors in a color scheme conceals a major difficulty. First, with the end user changing only a few dominant colors in the color scheme according to end user preference, the visually consistent overall scheme can be lost. Second, to edit the full palette of colors can be a very time consuming process that requires excellent graphic design expertise generally lacking within the end user base.

The foregoing problem of color scheme customization has been addressed according to a variety of different methodologies. For instance, one methodology provides for the ability to shift a full scheme according to a color-centric parameter such as hue, value or saturation. While useful, shifting a color scheme based upon hue, value or saturation fails to account for the color contrast that should be maintained to preserve the quality of a color scheme in order to better reflect on the significance of each color (including foreground and background roles of each color in the scheme). Another methodology provides for the preservation of some colors in the color scheme while applying a new color scheme to a document. Yet, as before, the harmonic relationships of the colors are not taken in consideration when global adjustments of the color scheme are performed. Finally, in yet another methodology, different possible variations of a color scheme are generated and presented to the end user for selection according to end user preference. Still, once again, the color scheme is adjusted according to the color properties independently of the harmonic relationships of the colors (or the visual consistency of the set of colors taken as a whole).

BRIEF SUMMARY OF THE INVENTION

Embodiments of the present invention address deficiencies of the art in respect to color scheme management and provide a novel and non-obvious method, system and computer program product for generating a color scheme from a base selection of colors while preserving visual consistency of the colors in the color scheme. In an embodiment of the invention, a method of generating a UI visual presentation attribute scheme while preserving visual consistency of selected visual presentation attributes in the color scheme is provided. The method includes establishing a hierarchy of UI elements in a directed acyclic graph of nodes.

Each node in the hierarchy corresponds to a different UI element and specifies a visual presentation attribute corresponding to the different UI element of the node. In this regard, the visual presentation attribute can be a color. Further, the hierarchy defines different pairs of parent-child relationships amongst the nodes. As such, the method additionally includes establishing a transformation rule for each of the different pairs of parent-child relationships and assigning a visual presentation attribute to a parent one of the nodes in the hierarchy.

For instance, the transformation rule can include assigning to a child node a same visual presentation attribute as a corresponding parent node, computing color text for a child node according to a luminosity of a background color of a corresponding parent node, computing a relief color for a child node according to a red color value in a red-green-blue (RGB) model from a white background color of a corresponding parent node, computing a gray color from a brightness value in a hue-saturation-brightness (HSV) model of a background color of a corresponding parent node, or computing a complementary color from an RGB model of a background color of a parent node and computing a red color value derived from a red component of an RGB model value of a white color of the parent node, to name a few examples.

The method yet further includes computing a visual presentation attribute for each child node descending from the parent one of the nodes according to an established transformation rule. Finally, the method includes exporting the hierarchy into a visual presentation attribute scheme. To the extent the visual presentation attribute is a color, the visual presentation attribute scheme can be a color scheme applicable to an application to define the color scheme of the application.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for the automated generation of a color scheme from a root set of colors while preserving the visual consistency of the color scheme. In an embodiment of the invention, a directed acyclic graph of UI element targets can be constructed to which visual presentation attributes such as colors (or text attributes like color, font size and spacing) can be respectively applied. Those UI element targets can include by way of example, background and foreground colors, borders, captions both active and inactive, active and inactive controls, focus lines, foreground and background selections, to name only a few. Each node in the graph can correspond to a particular one of the UI element targets and a dependency relationship amongst the UI targets in respect to visual presentation attributes.

A transformation rule can be defined for different links in the graph such that a visual presentation attribute for a dependent UI element target of one node can be generated from the visual presentation attribute for UI element target of a parent node according to the transformation rule. Exemplary transformation rules include equivalence (using the same visual presentation attribute of the parent node), value increase (increasing the value of the visual presentation attribute of the parent node), value decrease (decreasing the value of the visual presentation attribute of the parent node), computing color text according to a luminosity of the background color, computing relief color according to a red color value in an RGB model from a white background color, computing a gray color from the brightness value in an HSV model of the background color, computing a complementary color from an RGB model of a background control, and computing a red color value derived from a red component of an RGB model value of a white color of a parent node.

Thereafter, a color scheme can be generated for each node dependent upon a root node through the provision of only a root node color value and the color scheme then can be applied to associated UI controls. At any time, the color scheme can be presented in a color scheme modification tool and an end user can manual change a color value for any of the nodes. In response to the end user changing a color value of a node, the color values for those nodes dependent upon the changed node can be derived according to corresponding transformation rules. Subsequently, the derived color scheme can be applied to associated UI controls.

Figure 1:
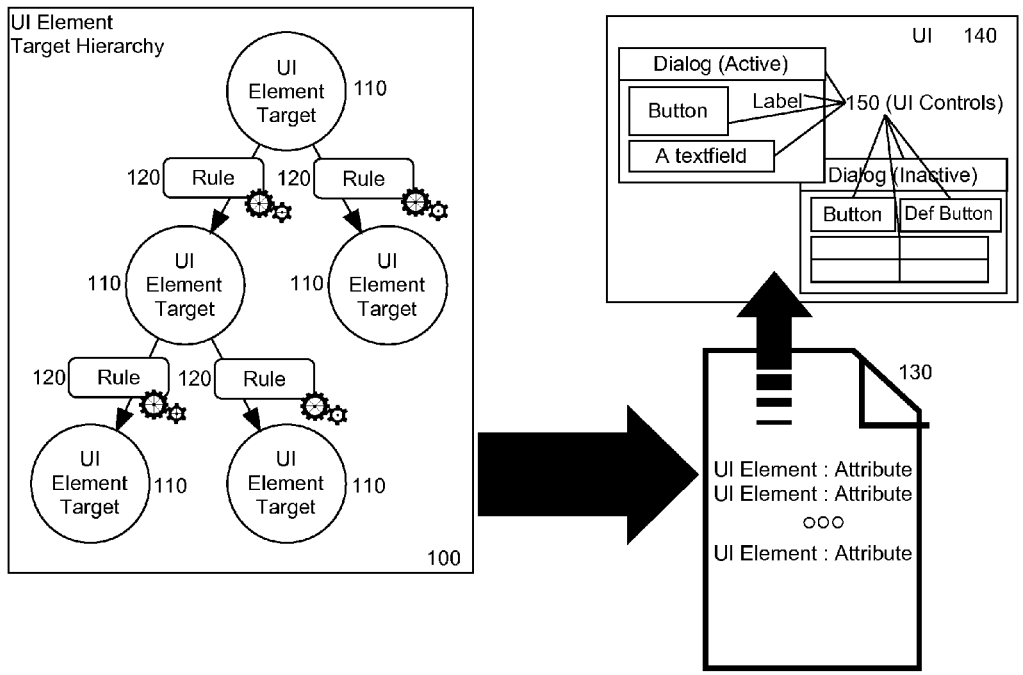
FIG. 1 is a pictorial illustration of a process for generating a UI color scheme while preserving visual consistency of selected visual presentation attributes in the color scheme.

In further illustration, FIG. 1 pictorially shows a process for generating a UI color scheme while preserving visual consistency of the color scheme. As shown in FIG. 1, a UI 140 can include different UI controls 150, such as windows, buttons, text fields, labels, dialog boxes and the like. The different UI controls 150 can be assigned different visual presentation attributes such as color, font type, font size, font color and font spacing. With respect to color as a visual presentation attribute, a color scheme 130 can be defined for the UI 140 so as to apply different colors to different UI controls 150, such as background colors for the UI controls 150, foreground colors for the UI controls 150, and border colors for the UI controls 150.

The color scheme 130 can include a table correlating different UI elements to different visual presentation attributes, such as color. The different UI elements in turn can be correlated to different ones of the UI controls. Therefore, specifying a particular color to a particular UI element in the color scheme 130 can result in the specified color being applied each of the UI controls 150 in the UI 140 corresponding to the particular UI element. Of note, a UI element target hierarchy 100 can be constructed for the UI elements of the color scheme 130. The hierarchy 100 can include a directed, acyclic graph of nodes 110, each node corresponding to a different UI element such that the graph of nodes 110 defines a parent-child dependency relationship between the UI elements of the color scheme 130.

A transformation rule 120 can be specified for each child one of the nodes 110 depending upon a parent one of the nodes 110. The transformation rule 120 assigned to a parent one of the nodes 110 and a corresponding child one of the nodes 110 can specify a rule for transforming visual presentation attribute, such as a color value, for the parent one of the nodes 110 into a visual presentation attribute, such as a color value, for the child one of the nodes 110. Exemplary transformation rules 120 in respect to color as a visual presentation attribute can include:

"Copy"—Child node assigned same color as parent node.

"computeColorText"—Compute text color for child node from the luminosity of the background color of the parent node. To compute the luminosity, use the YUV color model. If the luminosity is greater than 0.5 return black, otherwise return white.

"computeReliefColor"—If the background color of the parent node is a white color with the red color value (in RGB model) greater than 244, return the result of an increase of V value (in HSV model) of the background color of 15% for the child node. Otherwise, return white as the color for the child node.

"computeGrayFromColor"—Compute the brightness "V" value (in HSV model) of the background of the parent node to build a gray color. Decrease the V value of child node by 30% if V is greater than 0.5, otherwise increase V value of child node by 30%

"computeCompletaryColor"—We compute the completary color from the RGB model of the background gadget. Then we increase the difference by inversion of the luminosity.

"computeBorderColor(int borderType)"—To compute border colors for the child node based upon the border color of the parent node, compute the luminosity (in YUV model) of the border color of the parent node to determinate how to modify the V value (of the HSV model) to get the border colors of the child node. If the luminosity is greater than 0.88 then first border value is decreased by 24% and the second border value by =12%, however, if the luminosity is less than 0.12 then increase the first border value of the child node by 24% and the second border value by 12%. Otherwise increase the first border value by 12% and decrease the second border value by 12%

"increaseHsvValue(variation,toggle)"—Compute the brightness value (in HSV model) of the background color of the parent node. If the brightness value is greater than the toggle value, decrease the brightness value of the child node by the difference between the brightness value of the parent node and the toggle value, otherwise increase the brightness value of the child node by the difference between the brightness value of the parent node and the toggle value.

"computeWhiteForColor(backgroundC, borderC)"—If either the background color or the border color of the parent node is white, compute the smaller red color value of the white color or colors to compute a new white color for the child node where the red color is decreased by a value of ten (10). Otherwise, compute a new color which derives from the background color of the parent node with an increased luminosity (in YUV model) of twenty percent (20%).

It is to be noted that the foregoing selection of transformation rules 120 are merely exemplary and do not represent an exhaustive list of transformation rules 12.

Once the hierarchy 110 has been defined with nodes 110 corresponding to the different UI elements and the dependency relationship further defined amongst the nodes 110 along with respective transformation rules 120, an end user can select through a suitable UI a particular one of the nodes 110 and select a new visual presentation attribute, such as a color value. Thereafter, visual presentation attributes for each of the nodes 110 descending from the selected one of the nodes 110 can be computed according to the transformation rules 120. The resulting hierarchy 100 can be exported to a color scheme 130 and applied to the UI 140 so as to apply different colors of the color scheme 130 to the different UI controls 150.

Figure 2:
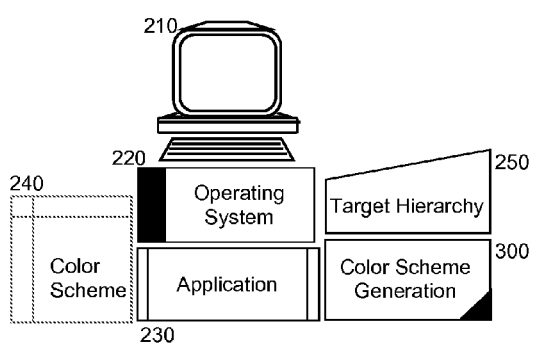
FIG. 2 is a schematic illustration of a UI color scheme generation data processing system configured for generating a UI color scheme while preserving visual consistency of selected visual presentation attributes in the color scheme; and, FIG. 3 is a flow chart illustrating a process for generating a UI color scheme while preserving visual consistency of selected visual presentation attributes in the color scheme.

The process described in connection with FIG. 1 can be implemented within a UI color scheme generation data processing system. In further illustration, FIG. 2 is a schematic illustration of UI color scheme generation data processing system configured for generating a UI color scheme while preserving visual consistency of the color scheme. The system can include a host computing system 210 that includes one or more computers each with at least one processor and memory. The host computing system 210 can support the operation of an operating system 220 through which an application 230 can execute according to a specified color scheme 240.

Color scheme generation module 300 can execute through the operating system 220. The module 300 can include program code that when executed in the memory of the computing system 210 can be enabled to define a hierarchy 250 of nodes corresponding to respective target UI elements and defining a color for each node in the hierarchy 250. The program code of the module 300 further can be enabled to define different transformation rules to be applied to different pairs of parent and child nodes in the hierarchy 250. The program code of the module 300 yet further can be enabled to apply the transformation rules to the different nodes based upon a specified color value for a parent node in the hierarchy 250 in order to generate the color scheme 240 for ultimate use in the application 230.

Figure 3:
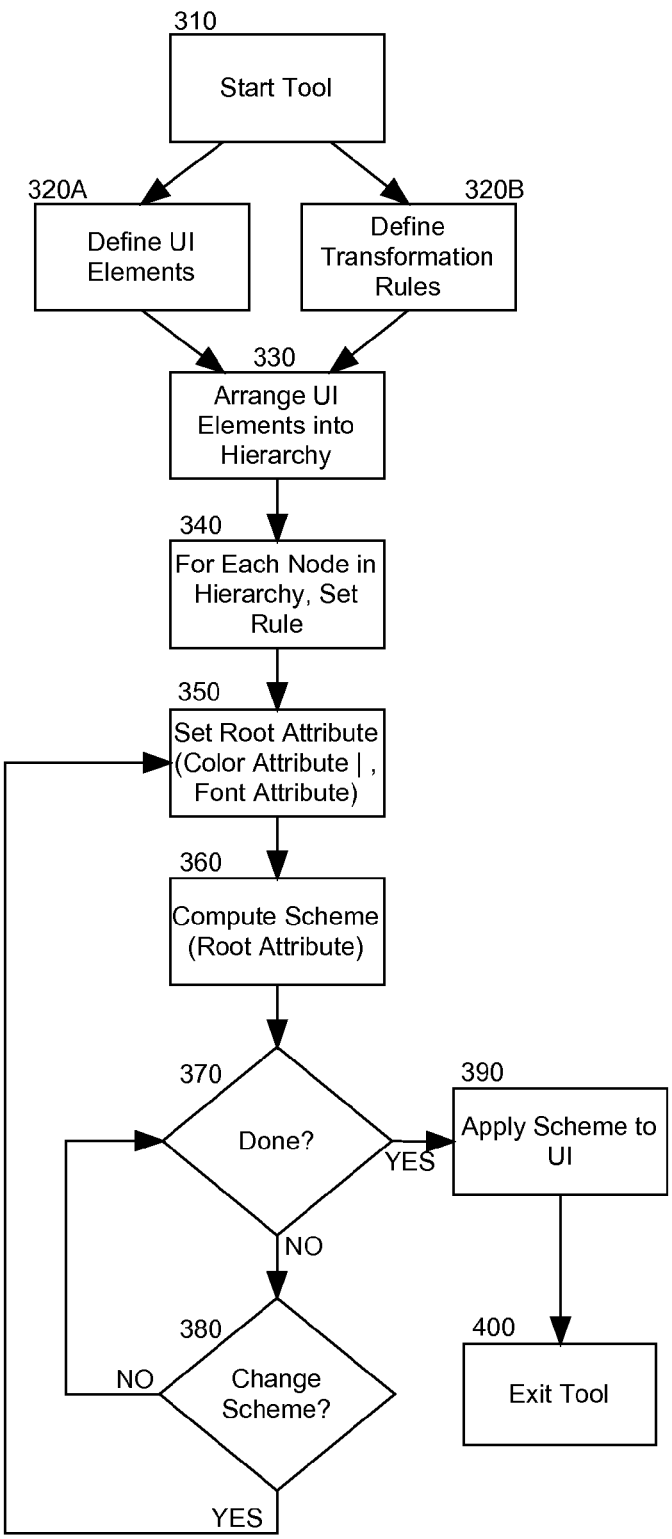

In yet further illustration of the operation of the color scheme generation module 300, FIG. 3 is a flow chart illustrating a process for generating a UI color scheme while preserving visual consistency of selected visual presentation attributes in the color scheme. Beginning in block 310, a UI scheme generation tool can be initialized for use by an end user. In block 320A, different UI elements can be defined for a UI as can different transformation rules in block 320B. In block 330, the UI elements can be arranged hierarchically so as to define parent-child dependencies amongst the UI elements. Finally, in block 340, for each parent-child node pair in the hierarchy, a transformation rule can be selected.

In block 350, a root visual presentation attribute can be established for a selected parent node in the hierarchy. For example, a color value can be established for the selected parent node in the hierarchy, or a font attribute value such as font type, font size or font color, can be established for the selected parent node in the hierarchy. Subsequently, in block 360 the attribute values for all children of the selected parent node can be computed according to the transformation rules assigned to each parent-child pair descending from the selected parent node. In decision block 370, if no further colors are to be established for any of the parent nodes in the hierarchy, in block 390 a resultant color scheme can be applied to a UI and in block 400 the tool can exit. Otherwise, in block 380 if an additional color scheme is to be generated, the process can return to block 350.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method of generating a user interface (UI) visual presentation attribute scheme while preserving visual consistency of selected visual presentation attributes in the color scheme, the method comprising:
  establishing a hierarchy of UI elements in a directed acyclic graph of nodes, each node corresponding to a different UI element and specifying a visual presentation attribute corresponding to the different UI element of the node, the hierarchy defining different pairs of parent-child relationships amongst the nodes;
  establishing a transformation rule for each of the different pairs of parent-child relationships;
  assigning a visual presentation attribute to a parent one of the nodes in the hierarchy;
  computing a visual presentation attribute for each child node descending from the parent one of the nodes according to an established transformation rule; and,
  exporting the hierarchy into a visual presentation attribute scheme.

2. The method of claim 1, wherein the visual presentation attribute is a color and the visual presentation attribute scheme is a color scheme.

3. The method of claim 1, wherein the transformation rule comprises assigning to a child node a same visual presentation attribute as a corresponding parent node.

4. The method of claim 2, wherein the transformation rule comprises computing color text for a child node according to a luminosity of a background color of a corresponding parent node.

5. The method of claim 2, wherein the transformation rule comprises computing a relief color for a child node according to a red color value in a red-green-blue (RGB) model from a white background color of a corresponding parent node.

6. The method of claim 2, wherein the transformation rule comprises computing a gray color from a brightness value in a hue-saturation-brightness (HSV) model of a background color of a corresponding parent node.

7. The method of claim 2, wherein the transformation rule comprises computing a complementary color from an RGB model of a background color of a parent node and computing a red color value derived from a red component of an RGB model value of a white color of the parent node.

8. A user interface (UI) color scheme generation data processing system configured for generating a UI color scheme while preserving visual consistency of selected visual presentation attributes in the color scheme, the system comprising:
- a host computing system comprising at least one computer with at least one processor and memory;
- an operating system executing in the host computing system;
- an application hosted by the operating system; and,
- a color scheme generation module comprising program code executing in the memory of the host computing system and enabled to perform a method comprising:
  - establishing a hierarchy of UI elements in a directed acyclic graph of nodes, each node corresponding to a different UI element and specifying a color corresponding to the different UI element of the node, the hierarchy defining different pairs of parent-child relationships amongst the nodes;
  - establishing a transformation rule for each of the different pairs of parent-child relationships;
  - assigning a color to a parent one of the nodes in the hierarchy;
  - computing a color for each child node descending from the parent one of the nodes according to an established transformation rule; and,
  - applying the hierarchy as a color scheme for the application.

9. The system of claim 8, wherein the transformation rule comprises assigning to a child node a same color as a corresponding parent node.

10. The system of claim 8, wherein the transformation rule comprises computing color text for a child node according to a luminosity of a background color of a corresponding parent node.

11. The system of claim 8, wherein the transformation rule comprises computing a relief color for a child node according to a red color value in a red-green-blue (RGB) model from a white background color of a corresponding parent node.

12. The system of claim 8, wherein the transformation rule comprises computing a gray color from a brightness value in a hue-saturation-brightness (HSV) model of a background color of a corresponding parent node.

13. The system of claim 8, wherein the transformation rule comprises computing a complementary color from an RGB model of a background color of a parent node and computing a red color value derived from a red component of an RGB model value of a white color of the parent node.

14. A computer program product for generating a user interface (UI) visual presentation attribute scheme while preserving visual consistency of selected visual presentation attributes in the color scheme, the computer program product comprising:
- a computer readable storage medium having computer readable program code embodied therewith, the computer readable program code comprising:
  - computer readable program code for establishing a hierarchy of UI elements in a directed acyclic graph of nodes, each node corresponding to a different UI element and specifying a visual presentation attribute corresponding to the different UI element of the node, the hierarchy defining different pairs of parent-child relationships amongst the nodes;
  - computer readable program code for establishing a transformation rule for each of the different pairs of parent-child relationships;
  - computer readable program code for assigning a visual presentation attribute to a parent one of the nodes in the hierarchy;
  - computer readable program code for computing a visual presentation attribute for each child node descending from the parent one of the nodes according to an established transformation rule; and,
  - computer readable program code for exporting the hierarchy into a visual presentation attribute scheme.

15. The computer program product of claim 14, wherein the visual presentation attribute is a color and the visual presentation attribute scheme is a color scheme.

16. The computer program product of claim 14, wherein the transformation rule comprises assigning to a child node a same visual presentation attribute as a corresponding parent node.

17. The computer program product of claim 15, wherein the transformation rule comprises computing color text for a child node according to a luminosity of a background color of a corresponding parent node.

18. The computer program product of claim 15, wherein the transformation rule comprises computing a relief color for a child node according to a red color value in a red-green-blue (RGB) model from a white background color of a corresponding parent node.

19. The computer program product of claim 15, wherein the transformation rule comprises computing a gray color from a brightness value in a hue-saturation-brightness (HSV) model of a background color of a corresponding parent node.

20. The computer program product of claim 15, wherein the transformation rule comprises computing a complementary color from an RGB model of a background color of a parent node and computing a red color value derived from a red component of an RGB model value of a white color of the parent node.

\* \* \* \* \*